(12) United States Patent
Luo et al.

(10) Patent No.: US 8,817,588 B2
(45) Date of Patent: Aug. 26, 2014

(54) MULTIPLEXING DATA AND REFERENCE INFORMATION IN A WIRELESS COMMUNICATION SYSTEM

(75) Inventors: Xiliang Luo, San Diego, CA (US); Peter Gaal, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 310 days.

(21) Appl. No.: 12/909,704

(22) Filed: Oct. 21, 2010

(65) Prior Publication Data

US 2011/0096657 A1     Apr. 28, 2011

Related U.S. Application Data

(60) Provisional application No. 61/255,798, filed on Oct. 28, 2009.

(51) Int. Cl.
*H04J 11/00* (2006.01)
(52) U.S. Cl.
CPC .................................. *H01L 5/0001* (2013.01)
USPC ......................................................... 370/203
(58) Field of Classification Search
CPC ... H04L 5/0023; H04L 5/0048; H04L 5/0053; H04L 5/0055; H04L 5/0016; H04L 5/001; H04L 5/0007; H04J 13/004; H04J 13/0048; H04J 13/18; H04J 13/22; H04J 13/12; H04W 72/042; H04W 72/0406; H04W 72/0413; H04W 72/02; H04W 72/04; H04W 72/0466
USPC ................ 370/328–330, 335–337, 342–348, 370/478–485, 458, 436, 441–443; 375/260–265; 455/17, 59–61, 102–105
See application file for complete search history.

(56) References Cited

U.S. PATENT DOCUMENTS 5,982,315 A  11/1999 Bazarjani et al.
6,285,655 B1  9/2001 Lundby et al.
(Continued)

FOREIGN PATENT DOCUMENTS

CN   1930788 A   3/2007
EP   1732240 A1  12/2006
(Continued)

OTHER PUBLICATIONS

Alcatel-Lucent: "Multiplexing Method for Uplink Non-Data-Associated Control Signals", 36PP Draft, R1-070319, 3RD Generation Partnership Project (3GPP), Mobile Competence Centre, 650, Route Des Lucioles, F-06921 Sophia-Antipolis Cedex, France, vol. RAN WGI, No. Sorrento, Italy, 20070110, Jan. 10, 2007, XP050104354, [retrieved on Jan. 10, 2007].

(Continued)

*Primary Examiner* — Thai Hoang
(74) *Attorney, Agent, or Firm* — Anthony R. Morris

(57) ABSTRACT

Methods, devices and computer program products are provided to improve uplink communications in a wireless communication system. Reference symbols in an uplink transmission radio subframe are time-frequency multiplexed with additional data symbols. The multiplexed data symbols are transmitted in an uplink transmission to another device within the wireless communication network along with non-multiplexed data symbols. The multiplexing operations enable the transmission of additional data symbols without increasing the overhead associated with the transmission of symbols in the radio subframe.

28 Claims, 14 Drawing Sheets

(56) References Cited

U.S. PATENT DOCUMENTS

| | | | |
|---|---|---|---|
| 7,616,718 B2* | 11/2009 | Sato | 375/345 |
| 7,639,687 B1* | 12/2009 | Tsai et al. | 370/392 |
| 8,014,807 B2* | 9/2011 | Matsumoto et al. | 455/522 |
| 8,565,330 B2* | 10/2013 | Seki | 375/267 |
| 8,615,000 B2* | 12/2013 | Seyama et al. | 370/345 |
| 2007/0066305 A1* | 3/2007 | Deguchi | 455/436 |
| 2008/0075060 A1 | 3/2008 | Tiirola et al. | |
| 2008/0287155 A1 | 11/2008 | Xu et al. | |
| 2008/0298488 A1* | 12/2008 | Shen et al. | 375/260 |
| 2008/0316957 A1* | 12/2008 | Shen et al. | 370/328 |
| 2009/0201902 A1 | 8/2009 | Miki et al. | |
| 2011/0096657 A1* | 4/2011 | Luo et al. | 370/203 |
| 2011/0142107 A1* | 6/2011 | Pan et al. | 375/219 |
| 2011/0243066 A1* | 10/2011 | Nayeb Nazar et al. | 370/328 |
| 2012/0063400 A1* | 3/2012 | Papasakellariou et al. | 370/329 |
| 2013/0044692 A1* | 2/2013 | Nory et al. | 370/329 |

FOREIGN PATENT DOCUMENTS

| | | |
|---|---|---|
| EP | 2104255 A1 | 9/2009 |
| JP | 2005260900 A | 9/2005 |
| JP | 2008244559 A | 10/2008 |
| WO | WO-9914860 A1 | 3/1999 |
| WO | WO-2006109437 A1 | 10/2006 |
| WO | 2009107985 A1 | 9/2009 |

OTHER PUBLICATIONS

International Search Report and Written Opinion—PCT/US2010/054335, ISA/EPO—May 4, 2011.

ETRI: "Discussion on DM RS for Uplink SU-MIMO in LTE-A",3GPP TSG-RAN WG1#58b R1-094311,.

NTT Docomo,UL RS Enhancement for LTE-Advanced,3GPP R1-094245,0ctober 16, 2009.

* cited by examiner

MULTIPLEXING DATA AND REFERENCE INFORMATION IN A WIRELESS COMMUNICATION SYSTEM

The present application claims priority to U.S. Provisional Patent Application Ser. No. 61/255,798, entitled "METHOD AND APPARATUS FOR MULTIPLEXING DATA AND REFERENCE INFORMATION IN A WIRELESS COMMUNICATION SYSTEM," filed Oct. 28, 2009, the entirety of which is hereby incorporated by reference.

FIELD OF INVENTION

The present invention relates generally to the field of wireless communications and, more particularly to improving the signaling capacity of uplink communications.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal, or user equipment (UE), communicates with one or more base stations through transmissions on the forward and reverse links. The forward link (or downlink) refers to the communication link from the base stations to the user equipment, and the reverse link (or uplink) refers to the communication link from the user equipment to the base stations. This communication link can be established through a single-in-single-out, multiple-in-single-out or a multiple-in-multiple-out (MIMO) system.

In LTE systems, uplink transmissions include Reference Signals (RS) that are used for data demodulation (DM). The symbols associated with the uplink transmission of DM RS are time multiplexed with the data symbols within each LTE slot. While the transmission of DM RS is needed to enable channel estimation and demodulation of the uplink information, it constitutes an "overhead" that diminishes the system's capacity for carrying the actual data symbols.

SUMMARY

This section is intended to provide a summary of certain exemplary embodiments and is not intended to limit the scope of the embodiments that are disclosed in this application.

The disclosed embodiments relate to systems, methods, apparatus and computer program products that increase a wireless communication system's capacity to transmit data symbols. Such an increase in data capacity is facilitated by enabling the transmission of additional data symbols that are multiplexed with reference symbols of an uplink communication channel. One aspect of the disclosed embodiments relates to a method that includes identifying a set of symbols associated with a wireless communication system. Theses symbols comprise data symbols and reference symbols and each symbol spans a particular time-frequency extent. The method also includes multiplexing a data symbol with the identified reference symbols, where each multiplexed data and reference symbol also spans that particular time-frequency extent. The method further includes transmitting the multiplexed data and reference symbols in an uplink communication.

In one embodiment, the set of symbols are orthogonal frequency division multiplexing (OFDM) or single-carrier frequency division multiplexing (SC-FDM) symbols associated with a radio subframe of the wireless communication system. In this embodiment, the radio subframe comprises a first slot and a second slot, and each of the first slot and the second slot comprises one reference symbol and a plurality of data symbols. In another embodiment, the multiplexing that is carried out by the above noted method comprises applying a first cover code to the data symbols multiplexed with the reference symbols associated with the first slot and the second slot and applying a second cover code to the reference symbols associated with the first slot and the second slot. In this embodiment, the first and the second cover codes are orthogonal with each other. In one example, the first cover code is [+1, +1] and the second cover code is [+1, −1].

According to another embodiment, the multiplexing of the data symbol with the identified reference symbols includes multiplying the data symbol by a first sequence representing the reference symbol of the first slot, and adding the product to the first sequence. In this embodiment, the multiplexing further includes multiplying the data symbol by a second sequence representing the reference symbol of the second slot, and subtracting the product from the second sequence. In one example, the first and the second sequences have different cyclic shifts, but the same sequence groups and different base sequences. In another example, the first and the second sequences have different cyclic shifts, sequence groups and base sequences.

In one embodiment, the multiplexing of the data symbol with the identified reference symbols includes adding the data symbol to a first sequence representing the reference symbol of the first slot. In this embodiment, the multiplexing also includes multiplying the data symbol by a second sequence representing the reference symbol in the second slot and further multiplying the result by a complex conjugate of the first sequence. This embodiment further includes subtracting the product from the second sequence. Similar to the scenario described earlier, the first and the second sequences can have different cyclic shifts, but the same sequence groups and different base sequences. Further, the first and the second sequences can have different cyclic shifts, sequence groups and base sequences.

In another embodiment, the multiplexing of the data symbol with the identified reference symbols is carried out pursuant to an indication received as part of a Layer-3 or Layer-2 signaling.

Another aspect of the provided embodiments relates to a method that includes generating control information for enabling a device in a wireless communication system to combine data and reference symbols. The combining of the data and reference symbols includes identifying a set of symbols associated with the wireless communication system, where the symbols comprise data symbols and reference symbols and each symbol spans a particular time-frequency extent. The combining of the data and reference symbols further includes multiplexing a data symbol with the identified reference symbols, where each multiplexed data and reference symbol also spans that particular time-frequency extent. In addition to generating the above noted control information, this method also includes transmitting the control information to the device.

Another aspect of the provided embodiments relates to a device that includes means for identifying a set of symbols associated with a wireless communication system, where the symbols include data symbols and reference symbols and each symbol spans a particular time-frequency extent. The device further includes means for multiplexing a data symbol with the identified reference symbols, where each multiplexed data and reference symbol spans the same particular time-frequency extent. The device also includes means for transmitting the multiplexed data and reference symbols in an uplink communication.

Another aspect of the provided embodiments relates to a device that comprises means for generating control information for enabling a device in a wireless communication system to combine data and reference symbols. The combining of the data and reference symbols includes identifying a set of symbols associated with the wireless communication system, where the symbols comprise data symbols and reference symbols and each symbol spans a particular time-frequency extent. The combining of the data and reference symbols further includes multiplexing a data symbol with the identified reference symbols, where each multiplexed data and reference symbol also spans that particular time-frequency extent. The above-noted device further includes means for transmitting the control information to the device.

Another aspect of the disclosed embodiments relates to a device that includes a processor and a memory, which includes processor executable code. The processor executable code, when executed by the processor, configures the device to identify a set of symbols associated with a wireless communication system, where the symbols include data symbols and reference symbols and each symbol spans a particular time-frequency extent. The processor executable code, when executed by the processor, also configures the device to multiplex a data symbol with the identified reference symbols, where each multiplexed data and reference symbol also spans that particular time-frequency extent. The processor executable code, when executed by the processor, also configures the device to transmit the multiplexed data and reference symbols in an uplink communication.

Still another aspect of the provided embodiments relates to a device with a processor and a memory that includes processor executable code. The processor executable code, when executed by the processor, configures the device to generate control information for enabling a device in a wireless communication system to combine data and reference symbols. The combining of the data and reference symbols comprises identifying a set of symbols associated with the wireless communication system, where the symbols comprise data symbols and reference symbols and each symbol spans a particular time-frequency extent. The combining of the data and reference symbols also includes multiplexing a data symbol with the identified reference symbols, where each multiplexed data and reference symbol also spans that particular time-frequency extent. The processor executable code, when executed by the processor, additionally configures the device to transmit the control information to the device.

In another aspect of the disclosed embodiments a computer program product, embodied on a non-transitory computer readable medium, is provided. The computer program product includes computer code for identifying a set of symbols associated with a wireless communication system, where the symbols comprise data symbols and reference symbols, and each symbol spans a particular time-frequency extent. The computer program product also includes computer code for multiplexing a data symbol with the identified reference symbols, where each multiplexed data and reference symbol also span that particular time-frequency extent. The computer program product additionally includes computer code for transmitting the multiplexed data and reference symbols in an uplink communication.

Another aspect of the disclosed embodiments relates to a computer program product that is embodied on a non-transitory computer readable medium. The computer program product includes computer code for generating control information for enabling a device in a wireless communication system to combine data and reference symbols. The combining of the data and reference symbol includes identifying a set of symbols associated with the wireless communication system, where the symbols comprise data symbols and reference symbols and each symbol spans a particular time-frequency extent. The combining of data and reference symbols also includes multiplexing a data symbol with the identified reference symbols, where each multiplexed data and reference symbol also spans that particular time-frequency extent. The computer program product further includes computer code for transmitting the control information to the device.

Another aspect of the disclosed embodiments relates to a method that comprises receiving multiplexed data and reference symbols from a user equipment in a wireless communication system, where each multiplexed data and reference symbol spans the same time-frequency extent as a non-multiplexed data or reference symbol associated with the wireless communication system. The above noted method further includes demultiplexing a data symbol from the received multiplexed data and reference symbols and generating an estimate of the demultiplexed data symbol.

In one embodiment, each of the multiplexed data and reference symbols is an orthogonal frequency division multiplexing (OFDM) symbol or a single-carrier frequency division multiplexing (SC-FDM) symbol associated with a radio subframe of the wireless communication system. In this embodiment, the radio subframe comprises a first slot and a second slot. Moreover, a first multiplexed data and reference symbol is associated with the first slot and a second multiplexed data and reference symbol is associated with the second slot. In one variation, the received first and the second multiplexed data and reference symbols comprise a first cover code that is applied to the data symbols multiplexed with the reference symbols associated with the first slot and the second slot. In this variation, received first and second multiplexed data and reference symbols also include a second cover code that is applied to the reference symbols associated with the first slot and the second slot. Further, the first and the second cover codes are orthogonal with each other.

In another embodiment, the demultiplexing of data and reference symbols comprises multiplying the first multiplexed data and reference symbol by a conjugate of a first sequence representing the reference symbol associated with the first slot to obtain a first product. In this embodiment, the demultiplexing further includes multiplying the second multiplexed data and reference symbol by a conjugate of a second sequence representing the reference symbol associated with the second slot to obtain a second product. The final operation of this embodiment includes subtracting the second product from the first product. In one example, the first and the second sequences have different cyclic shifts, but the same sequence groups and different base sequences. In another example, the first and the second sequences have different cyclic shifts, sequence groups and base sequences.

According to another embodiment, the demultiplexing of data and reference signals comprises multiplying the second multiplexed data and reference symbol by a first sequence representing the reference symbol associated with the first slot and further multiplying the result by a complex conjugate of a second sequence representing the reference symbol associated with the second slot. In this embodiment, the demultiplexing also includes subtracting the resultant product from the first multiplexed data and reference symbol. In one variation of this embodiment, the first and the second sequences can have different cyclic shifts, but with the same sequence groups and different base sequences. In another variation, the first and the second sequences can have different cyclic shifts, sequence groups and base sequences.

Another aspect of the disclosed embodiments relates to a device that includes means for receiving multiplexed data and reference symbols from a user equipment in a wireless communication system, where each multiplexed data and reference symbol spans the same time-frequency extent as a non-multiplexed data or reference symbol associated with the wireless communication system. This device further includes means for demultiplexing a data symbol from the received multiplexed data and reference symbol, as well as means for generating an estimate of the demultiplexed data symbol.

Another aspect of the provided embodiments relates to a device that comprises a processor and a memory that includes processor executable code. The processor executable code, when executed by the processor, configures the device to receive multiplexed data and reference symbols from a user equipment in a wireless communication system, where each multiplexed data and reference symbol spans the same time-frequency extent as a non-multiplexed data or reference symbol associated with the wireless communication system. The processor executable code, when executed by the processor, also configures the device to demultiplex a data symbol from the received multiplexed data and reference symbols and generate an estimate of the demultiplexed data symbol.

In another aspect of the disclosed embodiments a computer program product, embodied on a non-transitory computer readable medium, is provided. The computer program product includes program code for receiving multiplexed data and reference symbols from a user equipment in a wireless communication system, where each multiplexed data and reference symbol spans the same time-frequency extent as a non-multiplexed data or reference symbol associated with the wireless communication system. The computer program product also includes program code for demultiplexing a data symbol from the received multiplexed data and reference symbols and program code for generating an estimate of the demultiplexed data symbol.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Various disclosed embodiments are illustrated by way of example, and not of limitation, by referring to the accompanying drawings, in which.

DETAILED DESCRIPTION

Figure 1:
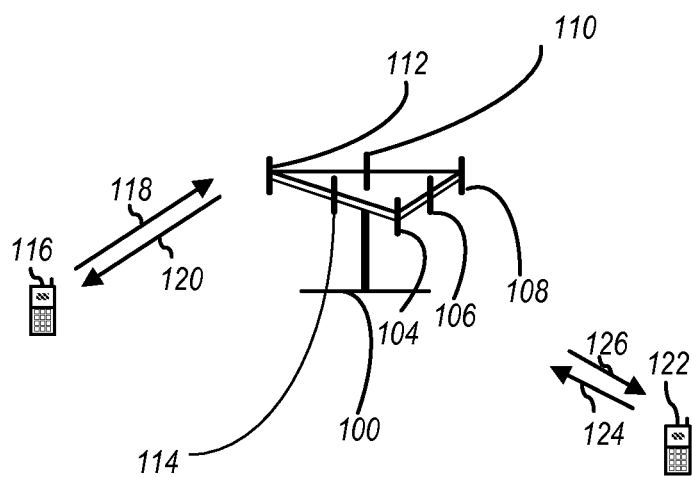
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, wireless node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplexing (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

As noted earlier, communications in the uplink and downlink between the base station and user equipment can be established through a single-in-single-out, multiple-in-single-out or a multiple-in-multiple-out (MIMO) system. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Further, the following terminology and features may be used in describing the various disclosed embodiments:

3G 3rd Generation
3GPP 3rd Generation Partnership Project
ACLR Adjacent channel leakage ratio
ACPR Adjacent channel power ratio
ACS Adjacent channel selectivity
ADS Advanced Design System
AMC Adaptive modulation and coding
A-MPR Additional maximum power reduction
ARQ Automatic repeat request
BCCH Broadcast control channel
BTS Base transceiver station
CDD Cyclic delay diversity
CCDF Complementary cumulative distribution function
CDMA Code division multiple access
CFI Control format indicator
Co-MIMO Cooperative MIMO
CP Cyclic prefix
CPICH Common pilot channel
CPRI Common public radio interface
CQI Channel quality indicator
CRC Cyclic redundancy check
DCI Downlink control indicator
DFT Discrete Fourier transform
DFT-SOFDM Discrete Fourier transform spread OFDM
DL Downlink (base station to subscriber transmission)
DL-SCH Downlink shared channel
DSP Digital signal processing
DT Development toolset
DVSA Digital vector signal analysis
EDA Electronic design automation
E-DCH Enhanced dedicated channel
E-UTRAN Evolved UMTS terrestrial radio access network
eMBMS Evolved multimedia broadcast multicast service
eNB Evolved Node B
EPC Evolved packet core
EPRE Energy per resource element
ETSI European Telecommunications Standards Institute
E-UTRA Evolved UTRA
E-UTRAN Evolved UTRAN
EVM Error vector magnitude
FDD Frequency division duplex
FFT Fast Fourier transform
FRC Fixed reference channel
FS1 Frame structure type 1
FS2 Frame structure type 2
GSM Global system for mobile communication
HARQ Hybrid automatic repeat request
HDL Hardware description language
HI HARQ indicator
HSDPA High speed downlink packet access
HSPA High speed packet access
HSUPA High speed uplink packet access
IFFT Inverse FFT
IOT Interoperability test
IP Internet protocol
LO Local oscillator
LTE Long term evolution
MAC Medium access control
MBMS Multimedia broadcast multicast service
MBSFN Multicast/broadcast over single-frequency network
MCH Multicast channel
MIMO Multiple input multiple output
MISO Multiple input single output
MME Mobility management entity
MOP Maximum output power
MPR Maximum power reduction
MU-MIMO Multiple user MIMO
NAS Non-access stratum
OBSAI Open base station architecture interface
OFDM Orthogonal frequency division multiplexing
OFDMA Orthogonal frequency division multiple access
PAPR Peak-to-average power ratio
PAR Peak-to-average ratio
PBCH Physical broadcast channel
P-CCPCH Primary common control physical channel
PCFICH Physical control format indicator channel PCH Paging channel
PDCCH Physical downlink control channel
PDCP Packet data convergence protocol
PDSCH Physical downlink shared channel
PHICH Physical hybrid ARQ indicator channel
PHY Physical layer
PRACH Physical random access channel
PMCH Physical multicast channel
PMI Pre-coding matrix indicator
P-SCH Primary synchronization signal
PUCCH Physical uplink control channel
PUSCH Physical uplink shared channel.

Figure 2:
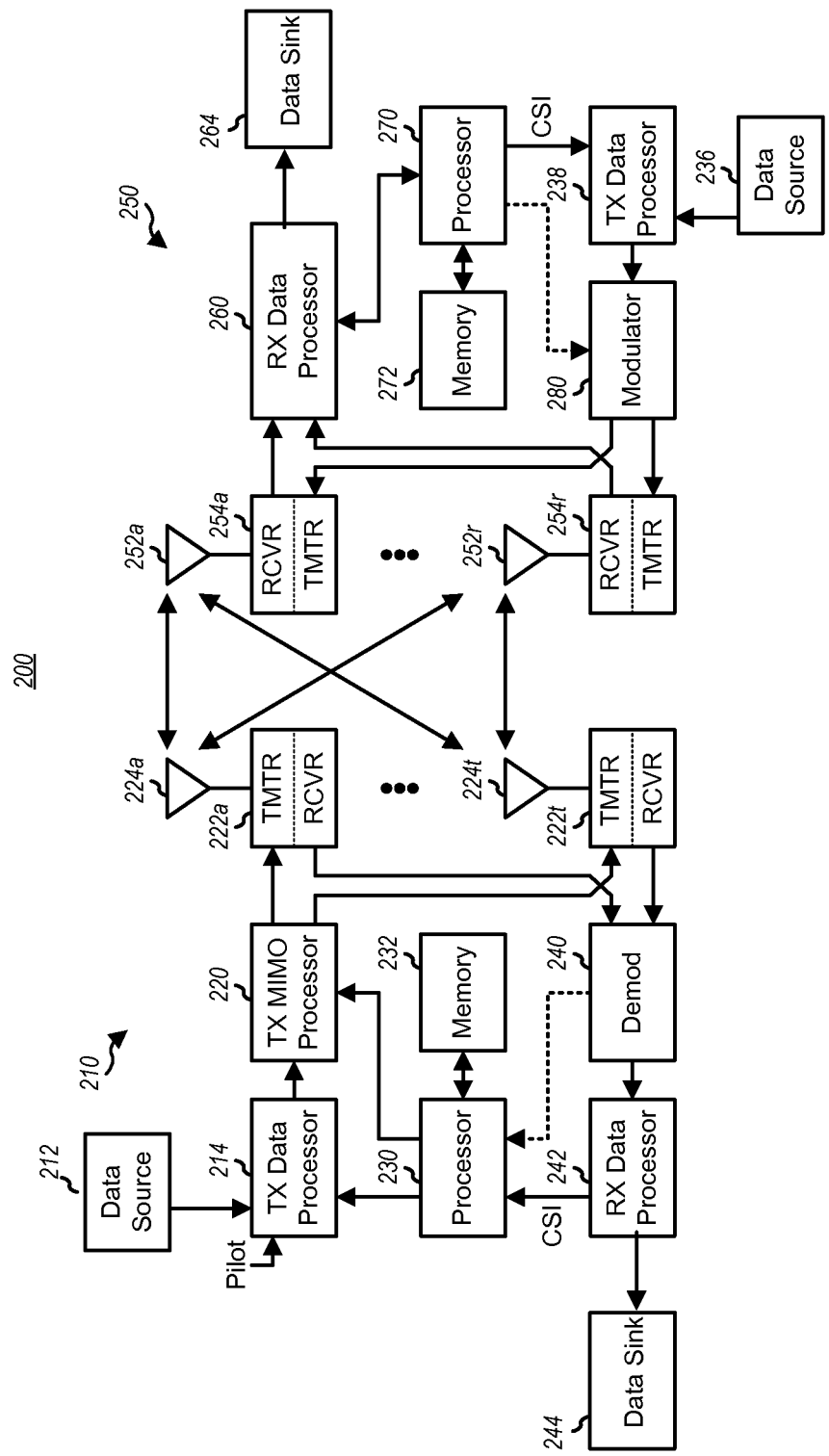
FIG. 2 illustrates a block diagram of a communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink 264.

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink 244.

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

Figure 3:
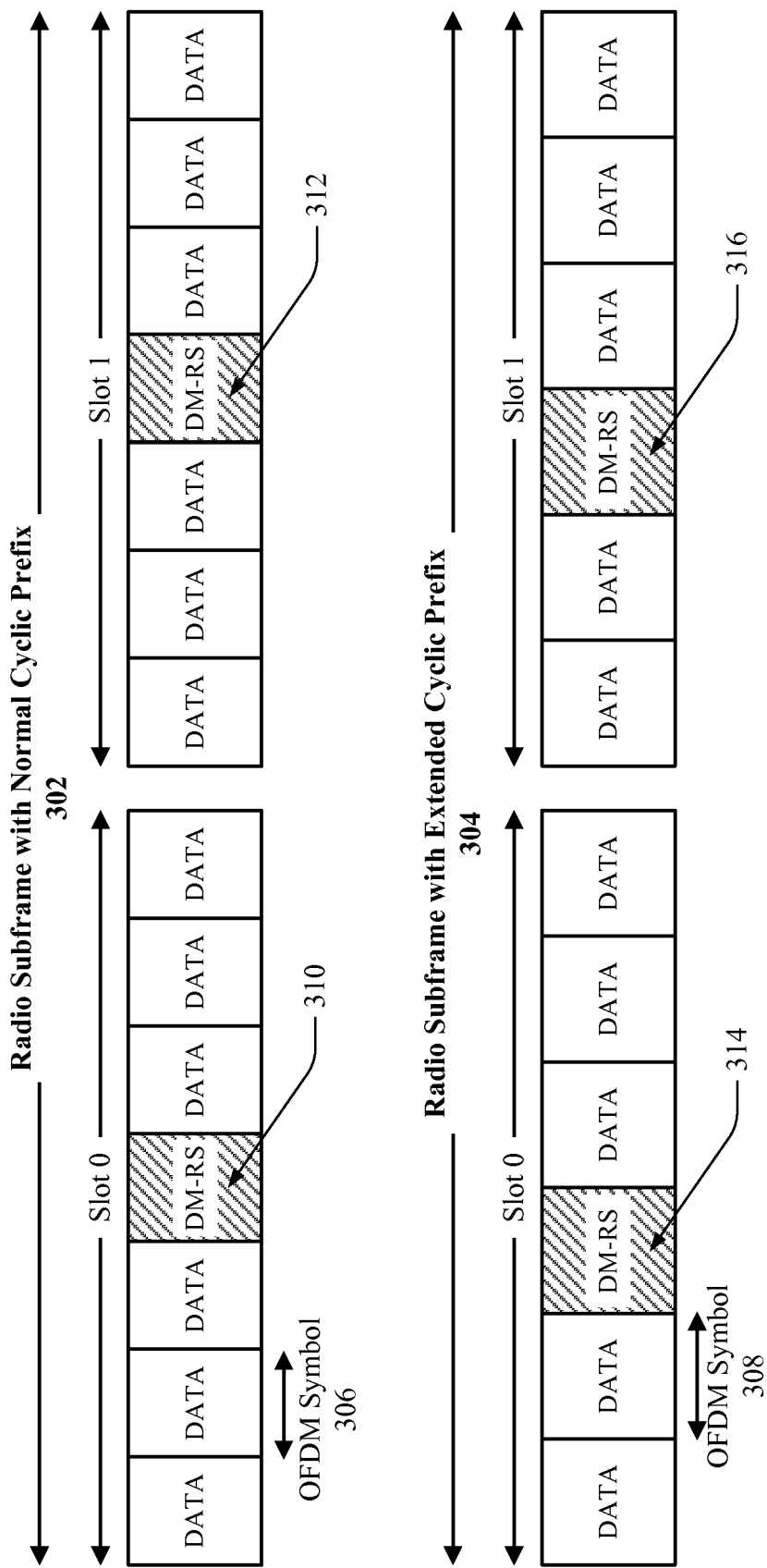
FIG. 3 illustrates radio subframes with normal and extended cyclic prefix in a wireless communication system.

As noted earlier, in conventional LTE systems (i.e., Release-8), a portion of an uplink channel transmission channel is dedicated to carrying Demodulation Reference Signals (DM RS). The DM RS enable channel estimation and coherent demodulation of the physical uplink shared channel (PUSCH). In these systems, certain OFDM symbols are dedicated for the transmission of the DM RS in each slot. FIG. 3 illustrates the locations of DM RS symbols within the uplink subframes of PUSCH in an LTE Rel-8 system. The top portion of FIG. 3 illustrates a normal cyclic preface radio subframe 302 with seven OFDM symbols 306 in each time slot. As illustrated in FIG. 3, the fourth symbol 310 of slot 0 and the fourth symbol 312 of slot 1 are designated for the transmission of the DM RS. The bottom portion of FIG. 3 illustrates a similar diagram for an extended cyclic preface radio subframe 304 with six OFDM symbols 308 in each slot. In this case, the third symbol 314 of slot 0 and the third symbol 316 of slot 1 are designated for the transmission of the DM RS. Based on the diagram of FIG. 3, it is evident that two out of fourteen symbols of every radio subframe with normal cyclic prefix (or approximately 14% of the PUSCH transmission bandwidth) is used for carrying the symbols associated with DM RS. In case of a radio subframe with an extended cyclic prefix, two out of twelve symbols (or approximately 17% of the PUSCH transmission bandwidth) is used for carrying the symbols associated with the DM RS.

Figure 4:
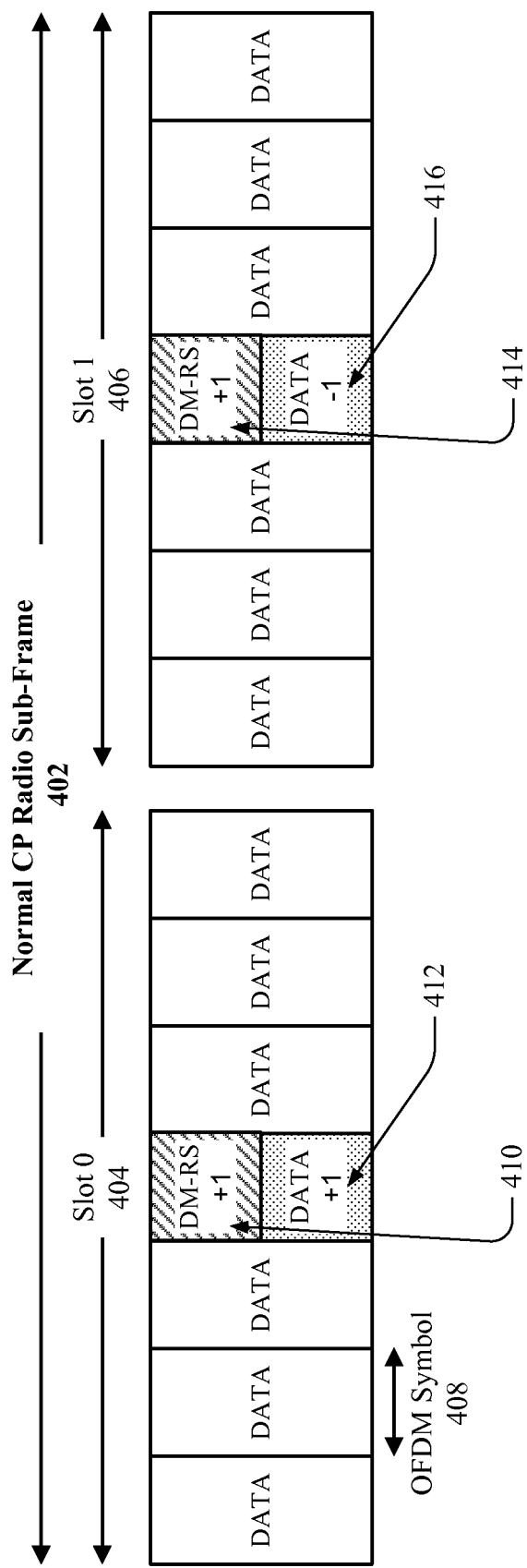
FIG. 4 is a diagram illustrating multiplexed data and reference symbols in accordance with an exemplary embodiment.

The disclosed embodiments enable the reduction of overhead associated with the transmission of DM RS by multiplexing additional data symbols with the symbols associated with the DM RS in a radio subframe. For example, such a reduction of overhead associated with DM RS may be effected in situations where the transmission rank is low (e.g., rank-one transmissions associated with beamforming) or when the signal to interference and noise ratio (SINR) is high. FIG. 4 illustrates a simple and flexible configuration that allows for the multiplexing of additional data symbols 412 and 416 with DM RS symbols 410 and 414, respectively, in accordance with an exemplary embodiment. Additional details regarding the multiplexing operation will be discussed in the sections that follow. The exemplary configuration of FIG. 4 depicts a configuration for an normal cyclic prefix radio subframe 402, which comprises seven OFDM symbols 408 in each of slot 0 404 and slot 1 406. Compared to the conventional LTE Rel-8 systems, the overhead associated with the transmission of DM RS for a normal cyclic prefix subframe is, therefore, reduced approximately in half (i.e., to about 7% of the PUSCH transmission capacity) when the above-noted configuration is utilized. The overhead associated with the transmission of DM RS for an extended cyclic prefix subframe is similarly reduced approximately in half (i.e., to about 8% of the PUSCH transmission capacity). It should be noted that the above described multiplexing of additional data symbols with the DM RS symbols can be readily implemented in situations where frequency hopping at slot boundaries is disabled. Disabling of frequency hopping ensures that the same set of subcarriers are used for the transmission of both slots 0 and 1 of a radio subframe.

It should be further noted that while the exemplary diagram of FIG. 4 illustrates a set of OFDM symbols, the disclosed embodiments are equally applicable to configurations that utilize single-carrier frequency division multiple access (SC-FDMA) for the uplink. In SC-FDMA systems, the single carrier frequency division multiplexing (SC-FDM) symbols of the radio subframes are precoded OFDM symbols that are produced by subjecting the OFDM symbols to additional DFT processing prior to the conventional OFDMA processing.

In LTE Rel-8 systems, the cover code [+1, +1] is applied to the symbols associated with the DM RS each subframe. FIG. 4 further illustrates that the multiplexing of the data and DM RS can be effected by applying a [+1, +1] cover code to the DM RS symbols 410 and 414, while applying a [+1, −1] cover code to the associated data symbols 412 and 416. It should be noted that the above-described example cover codes are provided to facilitate the understanding of the underlying concepts. However, the disclosed multiplexing of data and DM RS can be effected by applying two orthogonal cover codes: a first cover code for the data symbols and a second cover code for the symbols associated with the DM RS.

Figure 5:
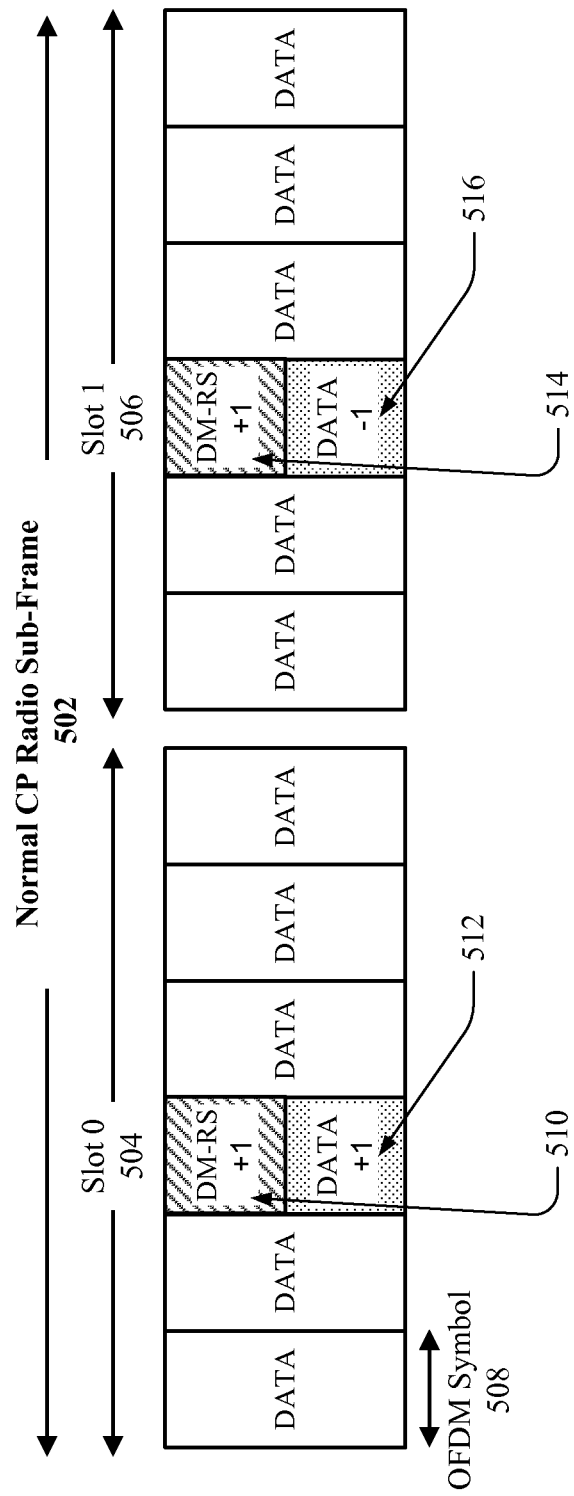
FIG. 5 is another diagram illustrating multiplexed data and reference symbols in accordance with an exemplary embodiment.

FIG. 5 shows a similar multiplexed configuration for an extended cyclic prefix radio subframe 502, which comprises six OFDM symbols 508 in each of slot 0 504 and slot 1 506. Similar to the configuration of FIG. 4, the DM RS symbols 510 and 514 are multiplexed with the additional data symbols 512 and 516. FIG. 5 also shows that the cover code [+1, +1] is applied to the DM RS symbols 510 and 514, while the cover code [+1, −1] is applied to the multiplexed data symbols 512 and 516. However, as noted earlier, other orthogonal cover codes can be also be used.

In LTE Rel-8 systems, the uplink reference signals are represented by sequences that have certain desirable properties such as low cubic metric (CM), desired cyclic autocorrelation properties, optimal cross-correlation values and the like. In particular, the sequences that are used for DM RS are generated according to the following:

$$r_{u,v}^{(\alpha)}(n) = e^{j\alpha n}\bar{r}_{u,v}(n), \text{ for } 0 \leq n < M \quad (1).$$

In Equation (1), M is the number of subcarriers to which the reference signal sequence is mapped (i.e., the length of the reference signal sequence), $\bar{r}_{u,v}(n)$ is the base (i.e., unshifted) base reference sequence, u is the sequence group, v is the base reference signal sequence ("base sequence"), and $\alpha$ is the cyclic shift associated with the reference signal sequence. According to the LTE Rel-8 specifications, at least one base sequence, v, is assigned for each resource block allocation size, and the complete set of available base sequences across all resource block allocation sizes is divided into 30 non-overlapping sequence groups, u, where $0 \leq u \leq 29$. Equation (1) further illustrates that a sequence associated with a reference signal can be generated by applying a cyclic shift (i.e., a linear phase shift) to a base sequence. Due to the special properties of the reference signal sequences, sequences that are generated by cyclically shifting a base sequence have zero correlations with respect to each other and can, therefore, be employed for transmissions on the same subcarrier. Moreover, according to LTE Rel-8 specifications, the base sequence, v, and the sequence group, u, can hop from one slot to another slot according to a cell-specific pattern when sequence-group hopping is enabled. Further, the cyclic shift, $\alpha$, always hops from slot to slot according to a cell-specific pseudo-random sequence. Therefore, the values of the base sequence, v, the sequence group, u, and the cyclic shift, $\alpha$, can change from slot to slot in a subframe.

In some embodiments, the special properties of the above-noted reference signal sequences are utilized to facilitate the multiplexing of DM RS sequences and the data symbols. Table 1 illustrates exemplary sequences associated with the transmission of DM RS sequences in the conventional LTE Rel-8 systems, as well as two alternative sequences that have been generated in accordance with the disclosed embodiments. These sequences can be transmitted, for example, as the fourth OFDM symbols of slot 0 and slot 1 of a radio subframe with normal cyclic prefix and/or as the third OFDM symbols of slot 0 and slot 1 of a radio subframe with extended cyclic prefix.

TABLE 1

DM RS Sequences in Slot 0 and Slot 1 of a Radio Subframe

| PUSCH Transmission Over M tones | DM RS Symbol in Slot 0 | DM RS Symbol in Slot 1 |
| --- | --- | --- |
| Reference Sequence (Conventional) | $r_{u,v}^{(\alpha)}(n) = e^{j\alpha n}\bar{r}_{u,v}(n)$ | $r_{s,t}^{(\beta)}(n) = e^{j\beta n}\bar{r}_{s,t}(n)$ |
| Multiplexed Sequence (Alternative 1) | $r_{u,v}^{(\alpha)}(n) + X(n) \cdot r_{u,v}^{(\alpha)}(n)$ | $r_{s,t}^{(\beta)}(n) - X(n) \cdot r_{s,t}^{(\beta)}(n)$ |
| Multiplexed Sequence (Alternative 2) | $r_{u,v}^{(\alpha)}(n) + X(n)$ | $r_{s,t}^{(\beta)}(n) - X(n) \cdot r_{s,t}^{(\beta)}(n) \cdot \text{conj}(r_{u,v}^{(\alpha)}(n))$ |

The conventional reference sequence of Table 1 that is designated for transmission in slot 0 was previously described in connection with Equation (1). The conventional reference sequence that is designated for transmission in slot 1 is similar to the sequence of slot 0 except for the presence of a different cyclical shift, $\beta$. Further, the conventional sequence of slot 1 can also have a sequence group, s, and a base sequence, t, that could be different from the corresponding sequence group and base sequence of slot 0 when sequence-group hopping is utilized.

Table 1 further illustrates Alternative 1 sequences associated with slot 0 and slot 1 that are generated in accordance with an exemplary embodiment. In particular, the Alternative 1 sequence for slot 0 is generated by adding the conventional DM RS sequence, $r_{u,v}^{(\alpha)}(n)$, to the product $X(n) \cdot r_{u,v}^{(a)}(n)$, where $X(n)$ represents the M-point discrete Fourier transform (DFT) of the time domain data-conveying modulation symbols, $x(n)$, for $n=0, \ldots, M-1$. Table 1 also illustrates a slot 1 sequence that is generated in Alternative 1 by subtracting the product $X(n) \cdot r_{s,t}^{(\beta)}(n)$ from the conventional DM RS sequence, $r_{s,t}^{(\beta)}(n)$. Alternative 1, therefore, represents one exemplary embodiment in which an additional M data symbols can be multiplexed with, and transmitted with, the DM RS sequences in an uplink transmission.

Alternative 2 sequences that are illustrated in Table 1 represent another exemplary embodiment in which additional data symbols can be transmitted with the DM RS sequences in a multiplexed fashion. In particular, the Alternative 2 sequence that is designated for transmission in slot 0 is generated by adding the conventional DM RS sequence, $r_{u,v}^{(\alpha)}(n)$, to the DFT of time domain data symbols, $X(n)$. Table 2 also illustrates that the Alternative 2 sequence that is designated for transmission in slot 1 is generated by subtracting the product $X(n) \cdot r_{s,t}^{(\beta)}(n) \cdot \text{conj}(r_{u,v}^{(\alpha)}(n))$ from the conventional DM RS sequence, $r_{s,t}^{(\beta)}(n)$. In this expression, $\text{conj}(r_{u,v}^{(\alpha)}(n))$ is the complex conjugate of the conventional DM RS sequence, $r_{u,v}^{(\alpha)}(n)$.

It should be noted that the exemplary listings of Table 1 illustrate simplified scenarios that assume equal power allocations between the conventional DM RS sequences and the multiplexed data symbols. However, in some embodiments, the transmission power ratio between the DM RS and data-carrying sequences can be flexibly adjusted. For example, in Alternative 1, an adjustable power factor, $\theta$, can multiply the data-carrying components of the sequences as follows: $\theta \cdot X(n) \cdot r_{s,t}^{(\beta)}(n)$. By adjusting the value of $\theta$ (in one or both slots), the optimum power allocation can be achieved. A similar power factor can analogously be implemented in Alternative 2 to multiply the data-carrying components of the Alternative 2 sequences. Moreover, for illustration purposes, the exemplary listings of Table 1 show particular Alternative 1 and Alternative 2 sequences that are designated for transmission in each of slots 0 and 1. However, it is understood that the data-carrying components associated with slot 0 and slot 1 sequences can be interchanged and/or transmitted with different polarities.

Table 2 provides a comparison between the sequences that are listed in Table 1 in terms of their cubic metric. In general, having a low cubic metric is desirable since this parameter provides a measure as to how much headroom is required to avoid entering into a non-linear operation region of the power amplifier. Examination of Table 2 reveals that the conventional reference sequences are characterized by low cubic metric in both slots. In contrast, Alternative 1 sequences, when compared to the conventional reference sequences, are characterized as having a high cubic metric in both slots 0 and 1. The higher cubic metric in Alternative 1 can be attributed to the presence of additional terms in the transmission signals associated with each slot. Table 2 further illustrates that Alternative 2 sequence is characterized by unequal cubic metrics in slots 0 and 1. Specifically, slot 0 is characterized by a "medium" cubic metric. The cubic metric of slot 1 depends on whether or not group-sequence hopping is enabled. For example, if group-sequence hopping is disabled (i.e., u=s and v=t), the slot 1 sequence simply becomes $r_{u,v}^{(\beta)}(n) - X(n)e^{j(\beta-\alpha)n}$, which is characterized by a medium cubic metric. However, if group-sequence hopping is enabled, slot 1 in Alternative 2 is characterized by a high cubic metric.

TABLE 2

Cubic Metric Comparison for Different Alternatives

| Schemes | Comments |
| --- | --- |
| Reference Sequence (Conventional) | Low cubic metric in both slots |
| Multiplexed Sequence (Alternative 1) | High cubic metric in both slots |
| Multiplexed Sequence (Alternative 2) | Medium cubic metric in slot 0; High cubic metric in slot 1 when group-sequence hopping utilized |

Figure 6:
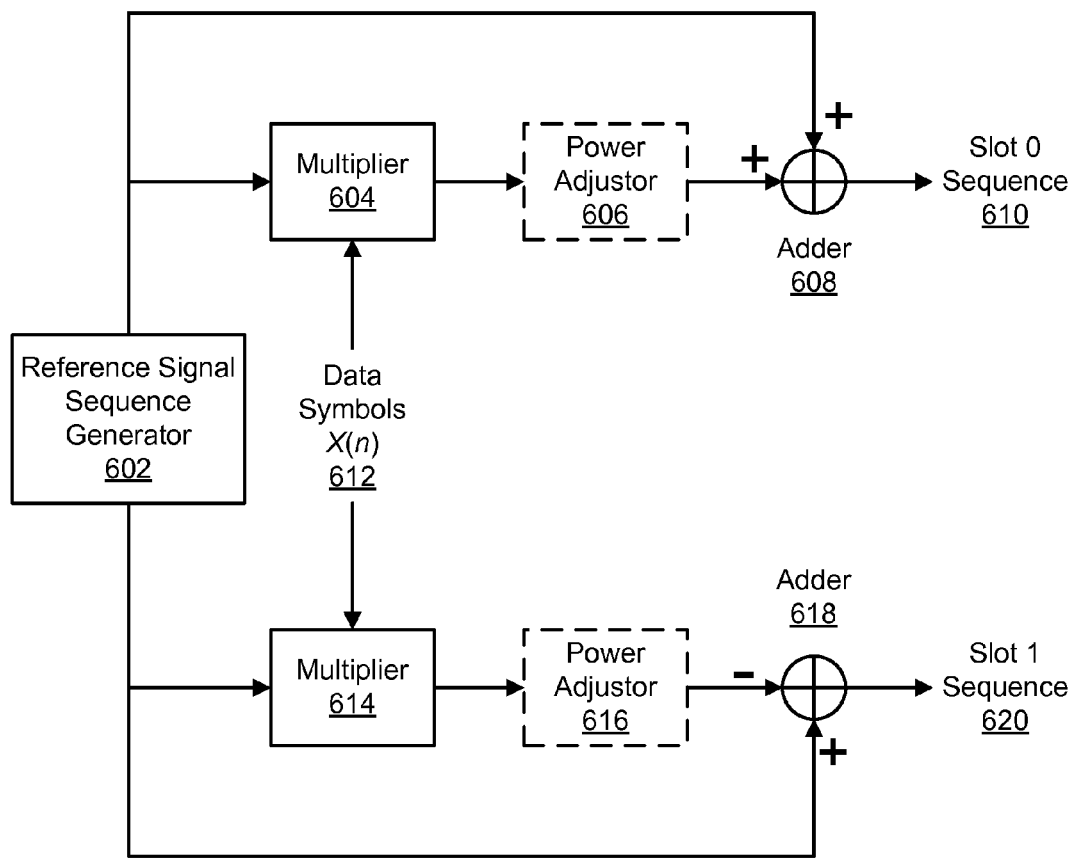
FIG. 6 illustrates a group of components for multiplexing data and reference symbols in accordance with an exemplary embodiment.

FIG. 6 illustrates various components for generating the Alternative 1 sequences in accordance with an exemplary embodiment. The reference sequence generator 602 is responsible for generating conventional reference signal sequences, such as the sequence expressed by Equation (1). In generating the slot 0 sequence 610, the output of the reference signal sequence generator 602 (e.g., a reference sequence with cyclic shift, $\alpha$, base sequence, v, and sequence group, u) is input to a multiplier 604 and is multiplied by the data symbols, $X(n)$, 612. The multiplier 604 output can be optionally adjusted by the power adjustor 606. The result is added, by an adder 608, to the output of the reference signal sequence generator 602. FIG. 6 also illustrates that the slot 1 sequence 620 is generated by multiplying the output of the reference signal sequence generator 602 (e.g., a reference sequence with cyclic shift, $\beta$, base sequence, s, and sequence group, t) by the data symbols, $X(n)$, 612, using the multiplier 614. The output of the multiplier 614 is then optionally adjusted by the power adjustor 616. The result is added, with negative polarity, to the output of the reference signal sequence generator 602 using the adder 618.

Figure 7:
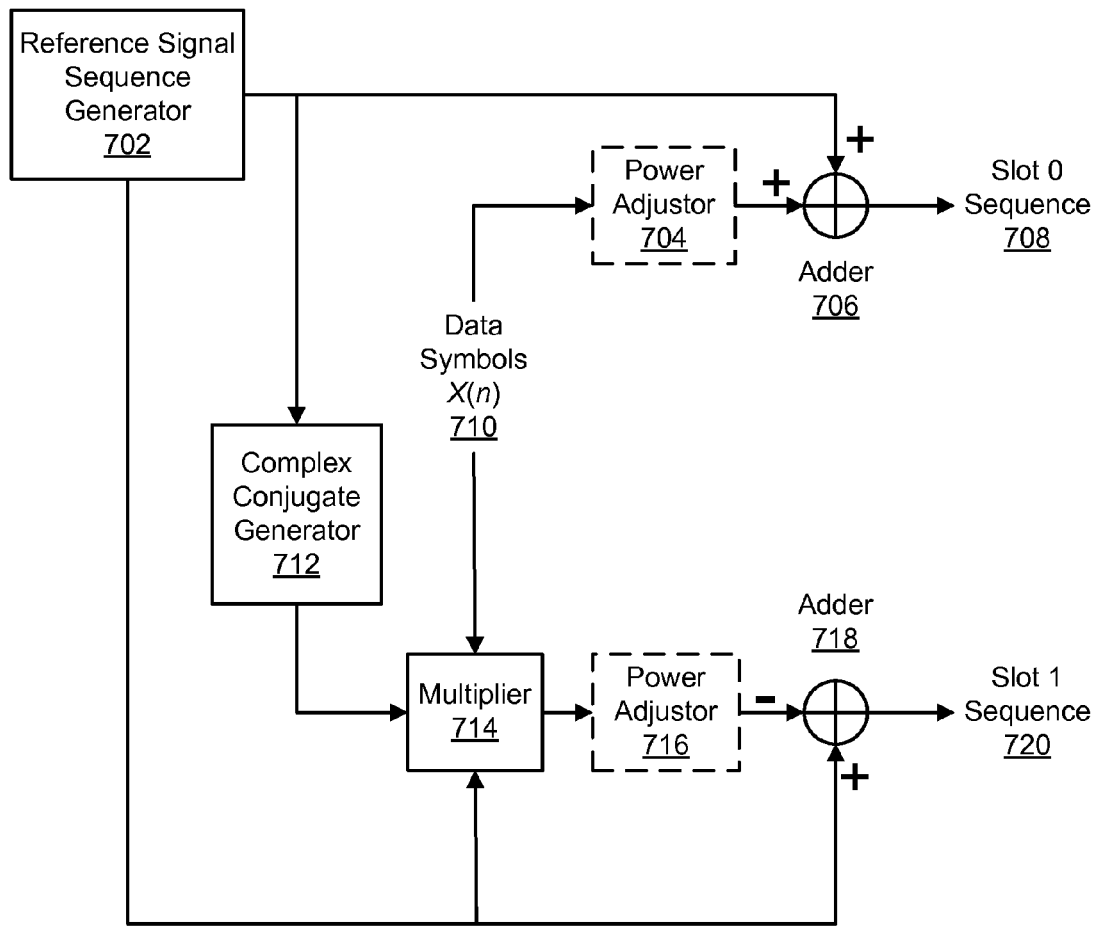
FIG. 7 illustrates another group of components for multiplexing data and reference symbols in accordance with an exemplary embodiment.

FIG. 7 depicts another group of components that can be configured to generate the Alternative 2 sequences in accordance with an exemplary embodiment. Similar to FIG. 6, the reference signal sequence generator 702 is responsible for generating conventional reference signal sequences, such as the sequence illustrated by Equation (1). The slot 0 sequence 708 is generated at the output of the adder 706 by adding the output of the reference signal generator 702 to the data symbols, $X(n)$, 710 that have been optionally adjusted by the power adjustor 704. FIG. 7 further illustrates that in order to generate the slot 1 sequence 720, the reference signal sequence that is generated for slot 0 by the generator 702 is input to the complex conjugate generator 712. Next, the multiplier 714 multiplies the output of the reference signal sequence generator 702 with the output of the complex conjugate generator 712 and the data symbols, $X(n)$, 710. The output of the multiplier 714 is then optionally adjusted by the power adjustor 716. The result is inverted (i.e., reversed in polarity) and added to the output of the reference signal sequence generator 702 using the adder 718.

Figure 8:
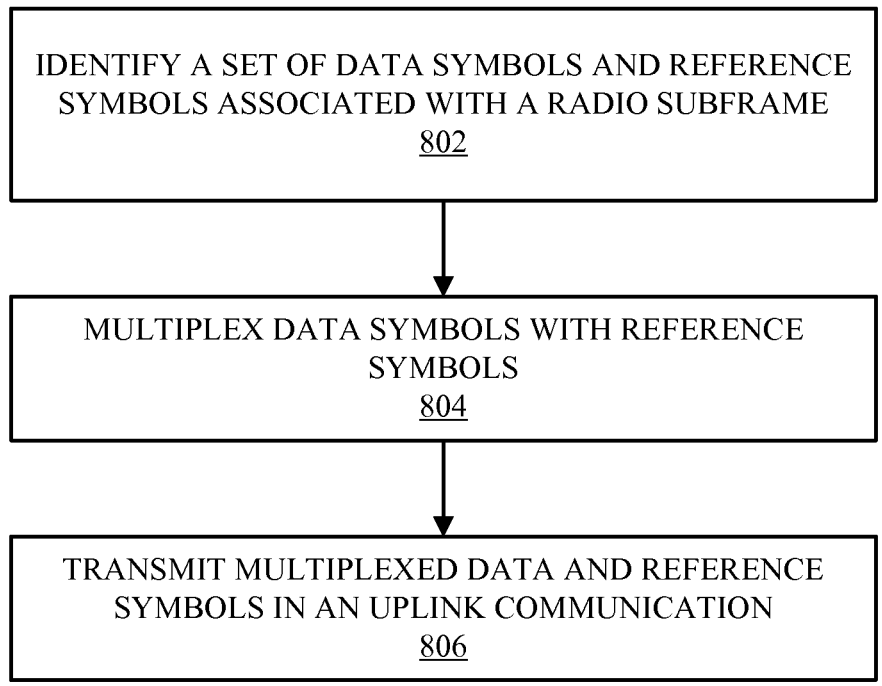
FIG. 8 illustrates a process for multiplexing data and reference symbols in accordance with an exemplary embodiment.

FIG. 8 illustrates a process 800 that facilitates the multiplexing of data and reference symbols of a wireless communication system in accordance with an exemplary embodiment. At 802, a set of data and reference symbols associated with a radio subframe are identified. In particular, the set of symbols can be OFDM symbols that correspond to a radio subframe with normal cyclic prefix (such as the subframe 402 that is depicted in FIG. 4) or a radio subframe with extended cyclic prefix (such as the subframe 502 that is depicted in FIG. 5). At 804, at least one data symbol is multiplexed with the reference symbols. For example, the multiplexing can be carried out to produce Alternative 1 or Alternative 2 sequences that are listed in Table 1. At 806, the multiplexed data and reference symbols are transmitted in an uplink communication. Due to the multiplexing of the data and reference symbols, the disclosed embodiments enable the transmission of additional data symbol, thereby increasing the data communication capacity of the wireless transmission system.

Upon the reception of the transmitted uplink communication, a receiving device (e.g., an eNodeB) can readily demultiplex the received information to obtain the transmitted data symbols. In particular, when Alternative 1 sequences are received at a device, the received sequences associated with slot 0, $R_0(n)$, and slot 1, $R_1(n)$, can be expressed as:

$$R_0(n)=H(n)\cdot[r_{u,v}^{(\alpha)}(n)+X(n)\cdot r_{u,v}^{(\alpha)}(n)] \qquad (2);$$

$$R_1(n)=H(n)\cdot[r_{s,t}^{(\beta)}(n)-X(n)\cdot r_{s,t}^{(\beta)}(n)] \qquad (3).$$

In Equations (2) and (3), $H(n)$ represents the transfer function associated with the uplink transmission channel. Due to the special properties of the conventional reference sequences that are represented by Equation (1), the result of multiplication of a particular reference sequence by its complex conjugate is unity. Therefore, multiplying $R_0(n)$ by the complex conjugate of the conventional DM RS sequence, $\text{conj}(r_{u,v}^{(\alpha)}(n))$ and multiplying $R_1(n)$ by the complex conjugate of the conventional DM RS sequence, $\text{conj}(r_{s,t}^{(\beta)}(n))$, produces:

$$R_0(n)\cdot\text{conj}(r_{u,v}^{(\alpha)}(n))=H(n)\cdot[1+X(n)] \qquad (4);$$

$$R_1(n)\cdot\text{conj}(r_{s,t}^{(\beta)}(n))=H(n)\cdot[1X(n)] \qquad (5).$$

Examining the right-hand side of Equations (4) and (5) reveals that an estimate of the data symbols, $X(n)$, can be readily obtained by, for example, subtracting Equation (5) from Equation (4), and dividing the result by 2. These operations produce $H(n)\cdot X(n)$, which represents the transmitted data symbols multiplied by the transmission channel transfer function. At this point, the estimation of the received data symbols becomes equivalent to the estimation of the received data symbols when no multiplexing is used. Therefore, conventional channel estimation and equalization techniques that are applicable to non-multiplexed data symbols can be utilized to obtain the values of the multiplexed data symbols.

Figure 9:
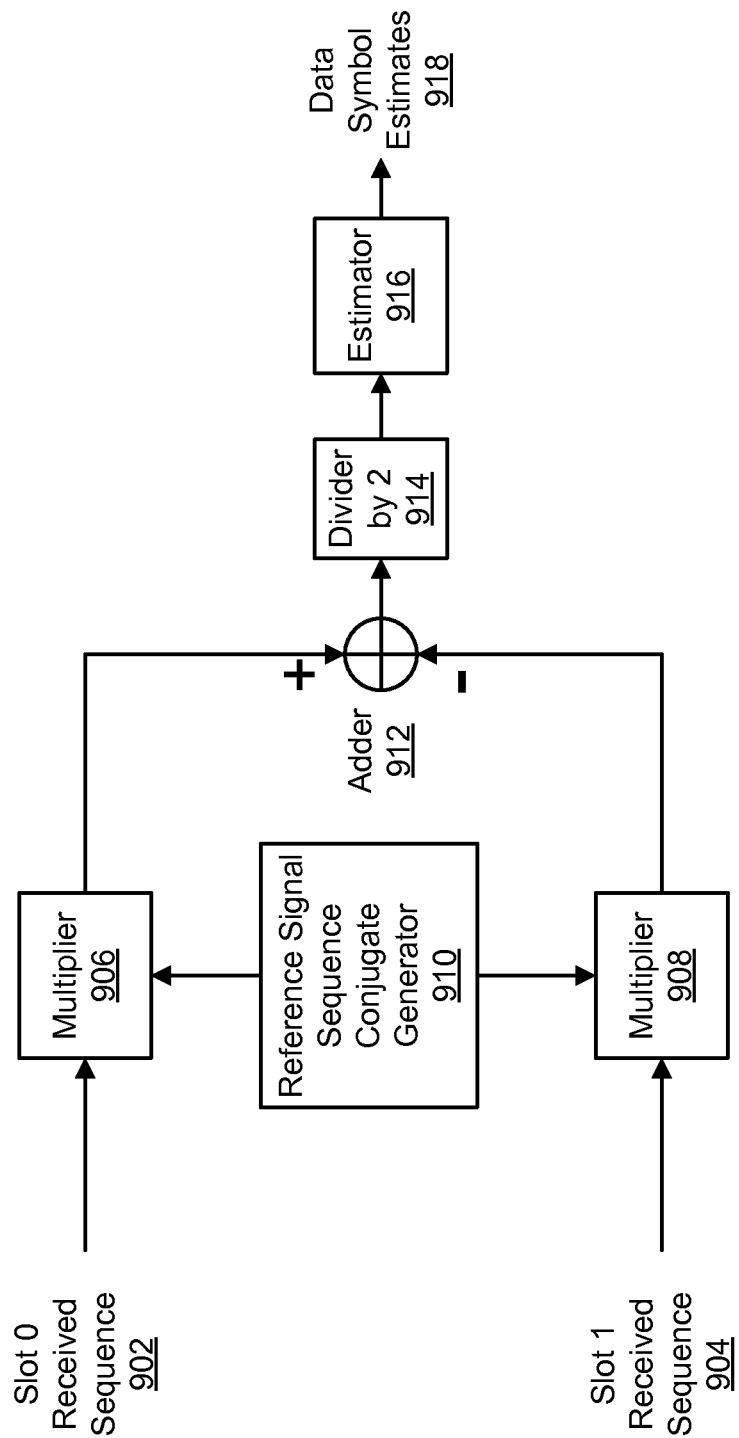
FIG. 9 illustrates a group of components for demultiplexing data and reference symbols in accordance with an exemplary embodiment.

FIG. 9 illustrates a group of components that are configured to generate data symbol estimates from a received sequence of Alternative 1 multiplexed data and reference symbols in accordance with an exemplary embodiment. The slot 0 received sequence 902 is input to the multiplier 906, where it is multiplied by an output produced by the reference signal sequence conjugate generator 910. The output of the reference signal sequence conjugate generator 910 is the complex conjugate of the reference signal associated with slot 0. Similarly, the slot 1 received sequence 904 is input to the multiplier 908, where it is multiplied by an output produced by the reference signal sequence conjugate generator 910 (i.e., the complex conjugate of the reference signal associated with slot 1). The output of the slot 1 multiplier 908 is inverted (i.e., reversed in polarity) and added, by the adder 912, to the output of the slot 0 adder 906. The output of the adder 912 is divided by 2 (using the "divider by 2" 914) and the result is processed by the estimator 916. The estimator 916 produces data symbol estimates 918 by utilizing various estimation techniques that are known in the art.

A receiver can similarly be configured to demodulate the data symbols from a received sequence that has formed according Alternative 2 methodology. In this configuration, the received sequences associated with slot 0, $R_0(n)$, and slot 1, $R_1(n)$, can be represented by:

$$R_0(n)=H(n)\cdot[r_{u,v}^{(\alpha)}(n)+X(n)] \qquad (6);$$

$$R_1(n)=H(n)\cdot[r_{s,t}^{(\beta)}(n)-X(n)\cdot r_{s,t}^{(\beta)}(n)\cdot\text{conj}(r_{u,v}^{(\alpha)}(n))] \qquad (7).$$

Upon the reception of these sequences, $R_1(n)$ is multiplied by both the slot 0 reference sequence, $r_{u,v}^{(\alpha)}(n)$, and the conjugate of slot 1 reference sequence, $\text{conj}(r_{s,t}^{(\beta)}(n))$, to produce:

$$R_1(n)\cdot\text{conj}(r_{s,t}^{(\beta)}(n))\cdot r_{u,v}^{(\alpha)}(n)=H(n)\cdot[r_{u,v}^{(\alpha)}(n)-X(n)] \qquad (8).$$

The right-hand sides of equations 6 and 8 can be readily combined to produce an estimate of the data symbols, $X(n)$, by, for example, subtracting Equation (8) from Equation (6), and dividing the result by 2.

Figure 10:
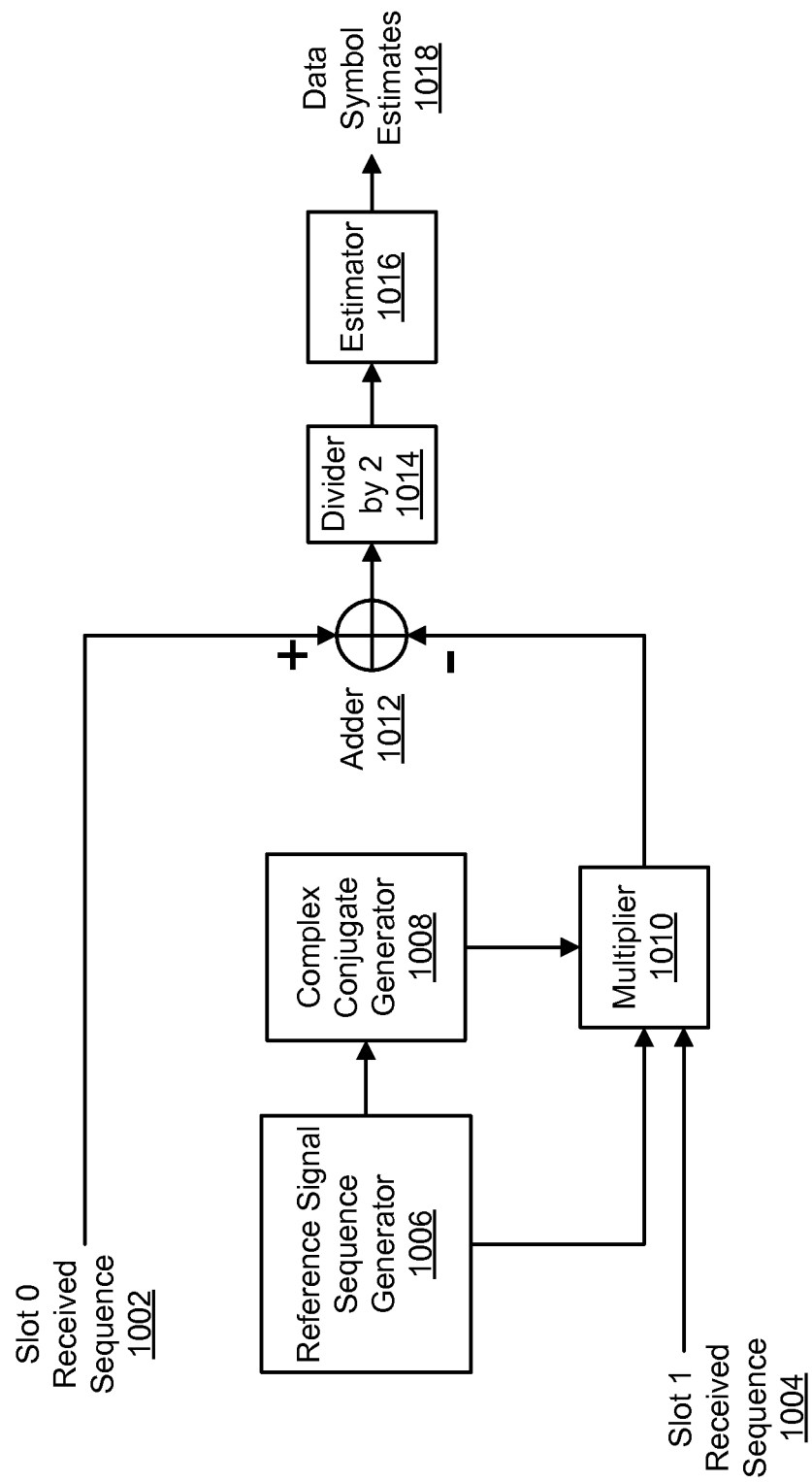
FIG. 10 illustrates another group of components for demultiplexing data and reference symbols in accordance with an exemplary embodiment.

FIG. 10 illustrates a group of components that are configured to generate data symbol estimates from a received sequence of Alternative 2 multiplexed data and reference symbols in accordance with an exemplary embodiment. FIG. 10 depicts the slot 1 received sequence 1004 that is an input to a multiplier 1010. The other two inputs of the multiplier 1010 are the reference sequence corresponding to slot 0 (generated by the reference signal sequence generator 1006) and the complex conjugate of the slot 1 reference sequence (generated by the complex conjugate generator 1008). The output of the slot 1 multiplier 1010 is inverted (i.e., reversed in polarity) and added to the slot 0 received sequence 1002 by the adder 1012. Similar to the configuration of FIG. 9, the output of the adder 1012 is divided by 2 (using the "divider by 2" 1014) and the result is processed by the estimator 1016 to produce data symbol estimates 1018.

With reference to FIGS. 6, 7, 9 and 10, it should be noted that reversing the polarity of (or inverting) the output of certain components (such as the power adjustor 616 of FIG. 6, the power adjustor 716 of FIG. 7, the multiplier 908 of FIG. 9 and the multiplier 1010 of FIG. 10) merely facilitates the implementation of the "subtraction" operations using the depicted adders. However, it is appreciated that a subtraction operation can be implemented using other equivalent configurations. Moreover, one or more lookup tables may be used to implement the functionality of certain components that are depicted in FIGS. 6, 7, 9 and 10. For example, in some embodiments, the reference signal sequences and/or their conjugates may be stored in memory locations. Such memory locations can be subsequently accessed by the appropriate components to retrieve the desired reference signal sequence or its conjugate. Therefore, a reference sequence and/or its conjugate may be readily generated through a look-up table configuration or through the systematic generation using the generator equations. It should also be appreciated that each of the FIGS. 6, 7, 9 and 10 illustrates multiple components with similar functionalities (e.g., multipliers 604 and 614, power adjustors 606 and 616, etc.). While these components have been depicted as separate components, it is understood that a single component (e.g., a single multiplier) may be configured to replace multiple instances of that component in each of the FIGS. 6, 7, 9 and 10.

Figure 11:
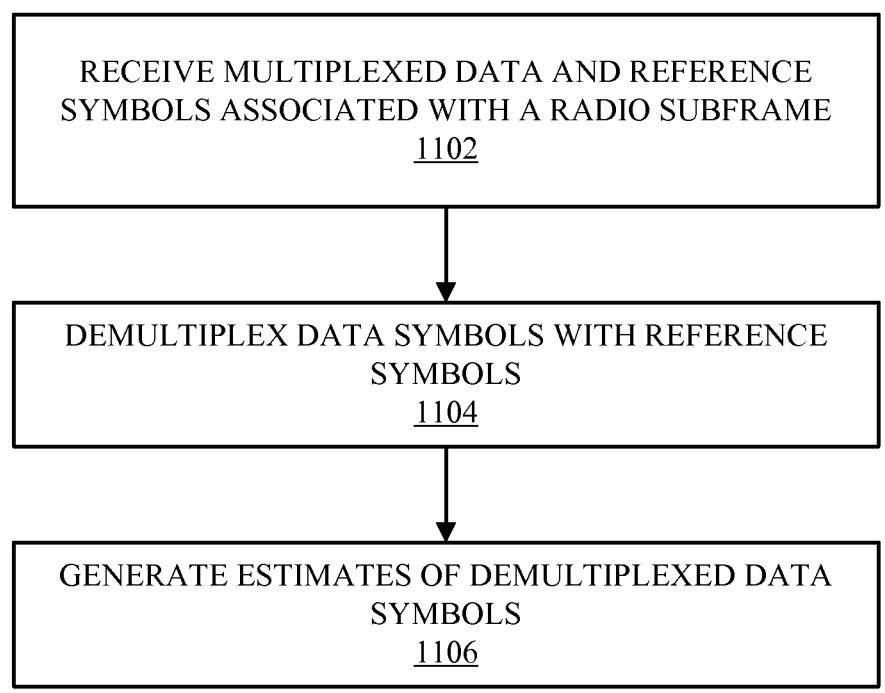
FIG. 11 illustrates a process for facilitating the estimation of received data symbols in accordance with an exemplary embodiment.

FIG. 11 illustrates a process 1100 that facilitates the estimation of data symbols in wireless communication system in accordance with an example embodiment. At 1102, the multiplexed data and reference symbols are received. For example, the multiplexed information can be received at an eNodeB as part of a PUSCH communication from a user equipment. In some embodiments, the received multiplexed data and reference symbols are part of an OFDM symbol associated with a radio subframe with normal cyclic prefix. In another embodiment, the received multiplexed data and reference symbols are part of an OFDM symbol associated with a radio subframe with extended cyclic prefix. At 1104, the data symbols are demultiplexed from the reference symbols. For example, the operations at 1104 can include demultiplexing of the received sequences that have been produced according to Alternative 1 or Alternative 2 multiplexing schemes of Table 1. At 1106, estimates of the demultiplexed data symbols are obtained. The operations at 1106 can, for example, comprise channel estimation and equalization operations.

Figure 12:
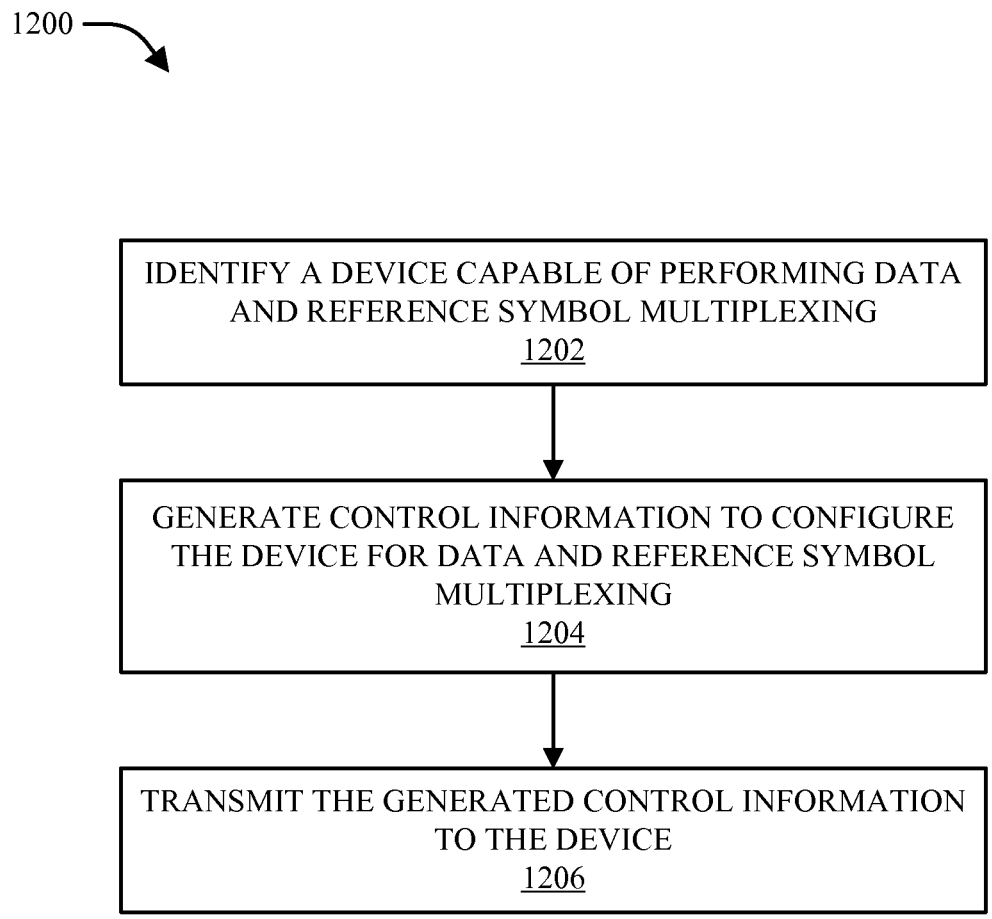
FIG. 12 illustrates a process for configuring a device to carry out data and reference symbol multiplexing in accordance with an example embodiment.

The disclosed embodiments further enable the identification and configuration of a user equipment in order to generate the multiplexed data and reference symbols in accordance with the disclosed embodiments. FIG. 12 is a flow chart that illustrates a process 1200 for configuring a device in accordance with an exemplary embodiment. At 1202, a device, such as a user equipment, is identified that is capable of performing data and reference symbol multiplexing. At 1204, control information is generated. The generated control information, once received at the identified device, can configure the device to carry out data and reference symbol multiplexing. At 1206, the control information is transmitted to the device. For example, the control information can be communicated in a downlink transmission channel of a wireless communication system. Upon the reception of the transmitted control information, the device can be configured to multiplex the data and reference symbols according to the previously described multiplexing methods, thereby communicating in an uplink channel with an increased communication capacity.

The control information that is described in the flow diagram of FIG. 12 can be generated and signaled by an eNodeB and/or another suitable network entity. In one embodiment, higher-layer (e.g., Layer-3) signaling can be utilized to communicate the control information. Layer-3 is responsible for establishing radio bearers and configuring all the lower layers using radio resource control (RRC) signaling between the eNodeB and the user equipment. In this embodiment, a user equipment can be semi-statically configured to perform data and reference multiplexing. A semi-static configuration is especially suitable in scenarios where changes in the uplink channel environment are slow. For example, such a semi-static configuration can be utilized when the user equipment is experiencing low Doppler and/or high geometry. In another embodiment, a lower layer (e.g., Layer-2) signaling can be utilized to convey the control information. In this embodiment, a user equipment can be dynamically scheduled for data and reference multiplexing. The singling in this embodiment can be effected by, for example, introducing an additional bit in the corresponding downlink control information (DCI) format for PUSCH scheduling.

Figure 13:
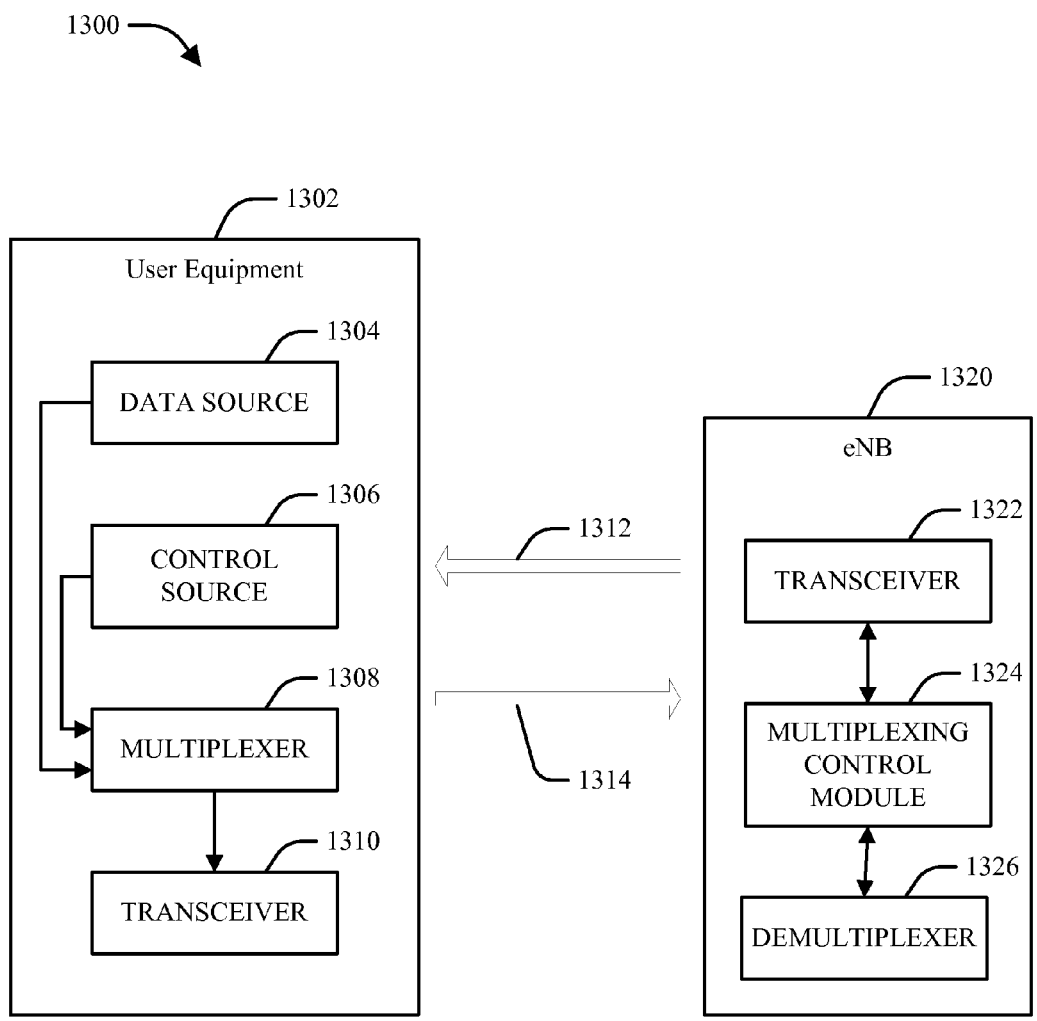
FIG. 13 illustrates a system within which various embodiments may be implemented.

FIG. 13 illustrates an exemplary system 1300 that can be configured to carryout the reference and data symbol multiplexing in accordance with the disclosed embodiments. The system 1300 can include one or more UEs 1302, which can communicate with one or more eNBs 1320 on an uplink 1314 and/or a downlink 1312 channel. The UE 1302 can transmit data, reference and/or control information (e.g., DM-RS information, etc.) to the eNB 1320 via a transceiver 1310. Data and control information can be generated and/or otherwise provided to the UE 1302 via a data source 1304 and/or a control source 1306, respectively. Information transmitted by the UE 1302 can be received at the eNB 1320 via a transceiver 1322 and/or other means.

The UE 1302 that is illustrated in FIG. 13 can further utilize a multiplexer 1308, which can be configured to multiplex data and reference symbols to be transmitted to the eNB 1320 on the uplink 1314. A multiplexing control module 1324 at the eNB 1320, and/or other suitable means associated with the system 1300, can be utilized to generate control information for configuring the UE 1302 and/or for managing the multiplexing operations of the UE 1302. For example, multiplexing control module 1324 can generate scheduling and/or control signaling, which can be transmitted to the UE 1302 via the transceiver 1322. The eNB 1320 of FIG. 13 also includes a demultiplexer 1326 that is configured to demultiplex data and reference symbols that are received from the UE 1302 via the uplink 1314. For example, the demultiplexer 1326 can be configured to demultiplex the data symbols that have been multiplexed with reference symbols according to Alternatives 1 and 2 of Table 1. The demultiplexer 1326 can also be in communication with the multiplexing control module 1324, which may facilitate some or a portion of the demultiplexing operations. The UE 1302 and/or the eNB 1320 of FIG. 13 can also include one or more processors and/or memory units that are not depicted in FIG. 13. The processor and the memory units can facilitate the processing of data and information by the various components and/or to enable communication between the various components.

Figure 14:
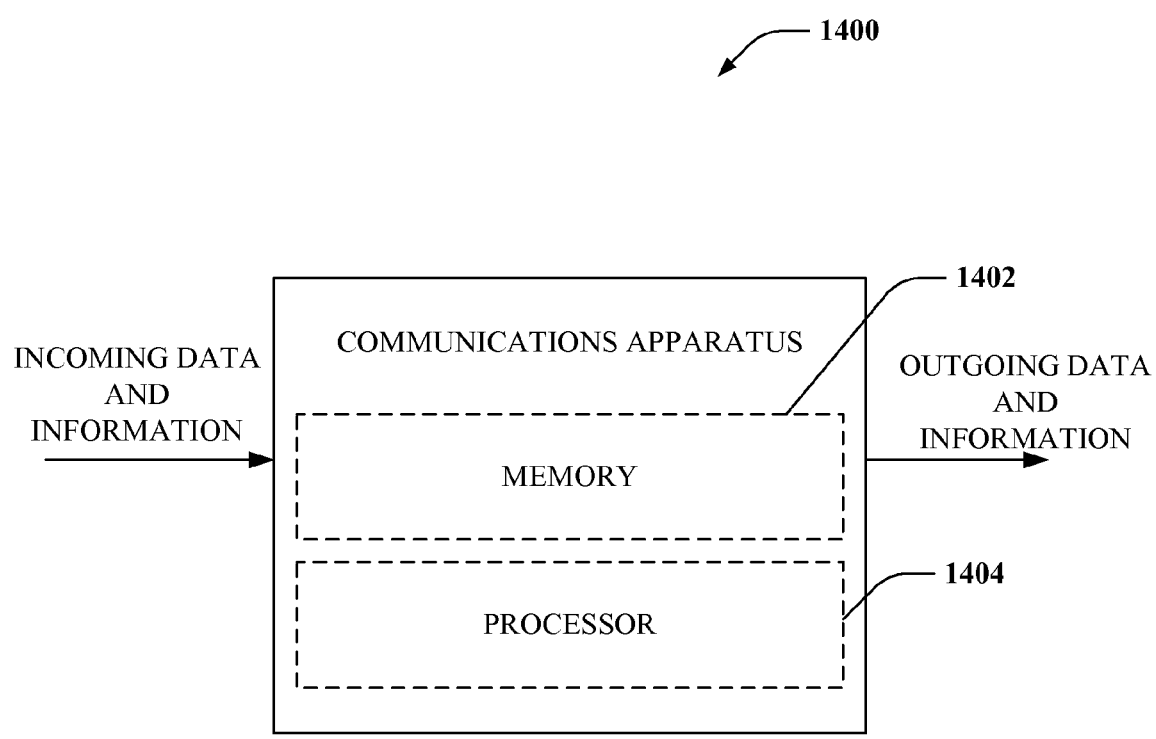
FIG. 14 illustrates an apparatus within which various embodiments may be implemented.

FIG. 14 illustrates an apparatus 1400 within which the various disclosed embodiments may be implemented. In particular, the apparatus 1400 that is shown in FIG. 14 may comprise at least a portion of an eNodeB or at least a portion of a user equipment (such as the eNB 1320 and the user equipment 1302 that are depicted in FIG. 13) and/or at least a portion of a transmitter system or a receiver system (such as the transmitter system 210 and the receiver system 250 that are depicted in FIG. 2). The apparatus 1400 of FIG. 14 can be resident within a wireless network and receive incoming data via, for example, one or more receivers and/or the appropriate reception and decoding circuitry (e.g., antennas, transceivers, demodulators and the like). The apparatus 1400 of FIG. 14 can also transmit outgoing data via, for example, one or more transmitters and/or the appropriate encoding and transmission circuitry (e.g., antennas, transceivers, modulators and the like). Additionally, or alternatively, the apparatus 1400 of FIG. 14 may be resident within a wired network.

FIG. 14 further illustrates that the apparatus 1400 can include a memory 1402 that can retain instructions for performing one or more operations, such as signal conditioning, analysis, multiplexing and the like. Additionally, the apparatus 1400 of FIG. 14 may include a processor 1404 that can execute instructions that are stored in the memory 1402 and/or instructions that are received from another device. The instructions can relate to, for example, configuring or operating the apparatus 1400 or a related communications apparatus. It should be noted that while the memory 1402 is depicted in FIG. 14 as a single block, it may comprise two or more separate memories that constitute separate physical and/or logical units. In addition, the memory 1402 while being communicatively connected to the processor 1404, may reside fully or partially outside of the apparatus 1400 that is depicted in FIG. 14. It is also to be understood that one or more components, such as the multiplexer 1308, the multiplexing control module 1324, the demultiplexer 1326 that are shown in FIG. 13 and the like, can exist within a memory such as the memory 1402 of FIG. 14.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1400 of FIG. 14 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. Therefore, the disclosed embodiments can be implemented as program code on a variety of non-transitory computer-readable media. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. 1302 FIG. 13). In the alternative, the processor and the storage medium may reside as discrete components in a user equipment (e.g., 13024 FIG. 13). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method, comprising:
    identifying a set of symbols associated with a wireless communication system, the symbols comprising data symbols and reference symbols, each symbol spanning a particular time-frequency extent;
    multiplexing an additional data symbol with the identified reference symbols, each multiplexed data and reference symbol multiplexed within a single symbol and spanning the particular time-frequency extent; and
    transmitting the multiplexed data and reference symbols in an uplink communication.

2. The method of claim 1, wherein:
    the set of symbols are orthogonal frequency division multiplexing (OFDM) or single-carrier frequency division multiplexing (SC-FDM) symbols associated with a radio subframe of the wireless communication system;
    the radio subframe comprises a first slot and a second slot; and
    each of the first slot and the second slot comprises one reference symbol and a plurality of data symbols.

3. The method of claim 2, wherein the multiplexing comprises:
    applying a first cover code to the additional data symbols multiplexed with the reference symbols associated with the first slot and the second slot; and
    applying a second cover code to the reference symbols associated with the first slot and the second slot, wherein the first and the second cover codes are orthogonal with each other.

4. The method of claim 3, wherein the first cover code is [+1, +1] and the second cover code is [+1, −1].

5. The method of claim 2, wherein the multiplexing comprises:
multiplying the additional data symbol by a first sequence representing the reference symbol of the first slot, and adding the product to the first sequence; and
multiplying the additional data symbol by a second sequence representing the reference symbol of the second slot, and subtracting the product from the second sequence.

6. The method of claim 5, wherein the first and the second sequences have different cyclic shifts, but same sequence groups and different base sequences.

7. The method of claim 5, wherein the first and the second sequences have different cyclic shifts, sequence groups and base sequences.

8. The method of claim 2, wherein the multiplexing comprises:
adding the additional data symbol to a first sequence representing the reference symbol of the first slot; and
multiplying the additional data symbol by a second sequence representing the reference symbol in the second slot and by a complex conjugate of the first sequence, and subtracting the product from the second sequence.

9. The method of claim 8, wherein the first and the second sequences have different cyclic shifts, but same sequence groups and different base sequences.

10. The method of claim 8, wherein the first and the second sequences have different cyclic shifts, sequence groups and base sequences.

11. The method of claim 1, wherein the multiplexing is carried out pursuant to an indication received as part of a Layer-3 or Layer-2 signaling.

12. A method, comprising:
generating control information for enabling a device in a wireless communication system to combine data and reference symbols, wherein combining the data and reference symbols comprises:
identifying a set of symbols associated with the wireless communication system, the symbols comprising data symbols and reference symbols and each symbol spanning a particular time-frequency extent, and
multiplexing an additional data symbol with the identified reference symbols, each multiplexed data and reference symbol multiplexed within a single symbol and spanning the particular time-frequency extent; and
transmitting the control information to the device.

13. A device, comprising:
means for identifying a set of symbols associated with a wireless communication system, the symbols comprising data symbols and reference symbols, each symbol spanning a particular time-frequency extent;
means for multiplexing an additional data symbol with the identified reference symbols, each multiplexed data and reference symbol multiplexed within a single symbol and spanning the particular time-frequency extent; and
means for transmitting the multiplexed data and reference symbols in an uplink communication.

14. A device, comprising:
means for generating control information for enabling a device in a wireless communication system to combine data and reference symbols, wherein combining the data and reference symbols comprises:
identifying a set of symbols associated with the wireless communication system, the symbols comprising data symbols and reference symbols and each symbol spanning a particular time-frequency extent, and
multiplexing an additional data symbol with the identified reference symbols, each multiplexed data and reference symbol multiplexed within a single symbol and spanning the particular time-frequency extent; and
means for transmitting the control information to the device.

15. A device, comprising:
a processor; and
a memory, including processor executable code, the processor executable code, when executed by the processor, configures the device to:
identify a set of symbols associated with a wireless communication system, the symbols comprising data symbols and reference symbols, each symbol spanning a particular time-frequency extent;
multiplex an additional data symbol with the identified reference symbols, each multiplexed data and reference symbol multiplexed within a single symbol and spanning the particular time-frequency extent; and
transmit the multiplexed data and reference symbols in an uplink communication.

16. The device of claim 15, wherein:
the set of symbols are orthogonal frequency division multiplexing (OFDM) or single-carrier frequency division multiplexing (SC-FDM) symbols associated with a radio subframe of the wireless communication system;
the radio subframe comprises a first slot and a second slot; and
each of the first slot and the second slot comprises one reference symbol and a plurality of data symbols.

17. The device of claim 16, wherein, as part of configuring the device to multiplex the additional data symbol and the identified reference symbols, the processor executable code, when executed by the processor, configures the device to:
apply a first cover code to the additional data symbols multiplexed with the reference symbols associated with the first slot and the second slot; and
apply a second cover code to the reference symbols associated with the first slot and the second slot, wherein the first and the second cover codes are orthogonal with each other.

18. The device of claim 17, wherein the first cover code is [+1, +1] and the second cover code is [+1, −1].

19. The device of claim 16, wherein, as part of configuring the device to multiplex the additional data symbol and the identified reference symbols, the processor executable code, when executed by the processor, configures the device to:
multiply the additional data symbol by a first sequence representing the reference symbol of the first slot, and add the product to the first sequence; and
multiply the additional data symbol by a second sequence representing the reference symbol of the second slot, and subtract the product from the second sequence.

20. The device of claim 19, wherein the first and the second sequences have different cyclic shifts, but same sequence groups and different base sequences.

21. The device of claim 19, wherein the first and the second sequences have different cyclic shifts, sequence groups and base sequences.

22. The device of claim 16, wherein, as part of configuring the device to multiplex the additional data symbol and the identified reference symbols, the processor executable code, when executed by the processor, configures the device to:
add the additional data symbol to a first sequence representing the reference symbol of the first slot; and
multiply the additional data symbol by a second sequence representing the reference symbol in the second slot and by a complex conjugate of the first sequence, and subtract the product from the second sequence.

23. The device of claim 22, wherein the first and the second sequences have different cyclic shifts, but same sequence groups and different base sequences.

24. The device of claim 22, wherein the first and the second sequences have different cyclic shifts, sequence groups and base sequences.

25. The device of claim 15, wherein the processor executable code, when executed by the processor, configures the device to multiplex the additional data symbol and the identified reference symbols pursuant to a an indication received as part of a Layer-3 or Layer-2 signaling.

26. A device, comprising:
a processor; and
a memory, including processor executable code, the processor executable code, when executed by the processor, configures the device to:
generate control information for enabling a device in a wireless communication system to combine data and reference symbols, wherein combining the data and reference symbols comprises:
identifying a set of symbols associated with the wireless communication system, the symbols comprising data symbols and reference symbols and each symbol spanning a particular time-frequency extent, and
multiplexing an additional data symbol with the identified reference symbols, each multiplexed data and reference symbol multiplexed within a single symbol and spanning the particular time-frequency extent; and
transmit the control information to the device.

27. A computer program product, embodied on a non-transitory computer readable medium, comprising:
computer code for identifying a set of symbols associated with a wireless communication system, the symbols comprising data symbols and reference symbols, each symbol spanning a particular time-frequency extent;
computer code for multiplexing an additional data symbol with the identified reference symbols, each multiplexed data and reference symbol multiplexed within a single symbol and spanning the particular time-frequency extent; and
computer code for transmitting the multiplexed data and reference symbols in an uplink communication.

28. A computer program product, embodied on a non-transitory computer readable medium, comprising:
computer code for generating control information for enabling a device in a wireless communication system to combine data and reference symbols, wherein combining the data and reference symbol comprises:
identifying a set of symbols associated with the wireless communication system, the symbols comprising data symbols and reference symbols and each symbol spanning a particular time-frequency extent, and
multiplexing an additional data symbol with the identified reference symbols, each multiplexed data and reference symbol multiplexed within a single symbol and spanning the particular time-frequency extent; and
computer code for transmitting the control information to the device.

* * * * *